United States Patent
Dubois et al.

(10) Patent No.: US 6,310,130 B1
(45) Date of Patent: Oct. 30, 2001

(54) COMPOSITIONS BASED ON POLYPHENYLENE SULPHIDE

(75) Inventors: Michel Dubois, Jodoigne; Béatrice Guyot; Richard Thommeret, both of Brussels, all of (BE)

(73) Assignee: Solvay, S.A., Brussels (BE)

( * ) Notice: Subject to any disclaimer, the term of this patent is extended or adjusted under 35 U.S.C. 154(b) by 0 days.

(21) Appl. No.: 08/011,499

(22) Filed: Jan. 29, 1993

(30) Foreign Application Priority Data

Feb. 5, 1992 (BE) .................................................. 09200122

(51) Int. Cl.$^7$ ............................... C08K 3/10; C08K 3/40
(52) U.S. Cl. ............................................. 524/436; 524/494
(58) Field of Search ...................................... 524/436, 494

(56) References Cited

U.S. PATENT DOCUMENTS

| | | |
|---|---|---|
| 3,354,129 | 11/1967 | Edmonds et al. . |
| 5,021,497 | 6/1991 | Ohara et al. ........................ 524/436 |

FOREIGN PATENT DOCUMENTS

| | | |
|---|---|---|
| 0278555A1 | 8/1988 | (EP) . |
| 63-189458 | * 8/1988 | (JP) . |
| 363189458A | 8/1988 | (JP) . |
| 3062-852A | 3/1991 | (JP) . |

OTHER PUBLICATIONS

Derwent Publications Ltd., London GB; Abstract No. (10 lines long).

* cited by examiner

*Primary Examiner*—Kriellion A. Sanders
(74) *Attorney, Agent, or Firm*—Marina V. Schnelller; Venable

(57) ABSTRACT

Compositions containing, per 100 parts by weight polyphenylene sulphide:

10 to 300 parts by weight of a polyamide, and 20 to 350 parts by weight of a metal hydroxide in which the main constituent is magnesium hydroxide. In addition, they preferably contain 20 to 500 parts by weight of a fibrous reinforcing material.

8 Claims, No Drawings

COMPOSITIONS BASED ON POLYPHENYLENE SULPHIDE

The present invention relates to compositions based on polyphenylene sulphide. It relates more precisely to compositions containing a polyphenylene sulphide with improved electrical properties.

Polyphenylene sulphide (referred to hereinafter briefly as PPS) exhibits an excellent heat stability and a very good chemical resistance which make it a choice material for the moulding of components which can be employed especially in electrical and electronic applications and in the motor vehicle industry.

In demanding electrical and electronic applications (circuit breakers, multipole rods, breaker bulbs etc.), however, a material must be available which combines heat resistance with a good compromise of two electrical properties which are the tracking current resistance and arc resistance.

Attempts have already been made to attain this objective by proposing compositions based on PPS containing magnesium hydroxide and, optionally, glass fibres (Japanese Patent Application (Kokai) published under number 89-318068 (Ube Industries)).

While these compositions exhibit a good heat resistance and a good arc resistance, their tracking current resistance is insufficient.

The invention aims to provide PPS-based compositions exhibiting at the same time, at a sufficient level, a heat resistance, a tracking current resistance and an arc resistance.

To this end, the present invention relates to compositions containing, per 100 parts by weight of polyphenylene sulphide: 10 to 300 parts by weight of a polyamide and 20 to 350 parts by weight of a metal hydroxide the main constituent of which is magnesium hydroxide.

The polyphenylene sulphide (PPS) present in the compositions according to the invention is a polymer containing at least 70 mol %, preferably at least 90 mol %, of p-phenylene sulphide repeat units of formula

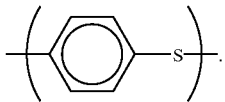

The PPSs containing at least 70 mol % of p-phenylene sulphide repeat units impart sufficient heat stability and chemical resistance to the compositions according to the invention. Less than 30 mol % of the repeat units present in the PPS may be chosen from those which have the structural formulae below:

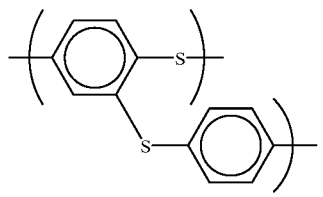

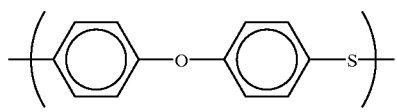

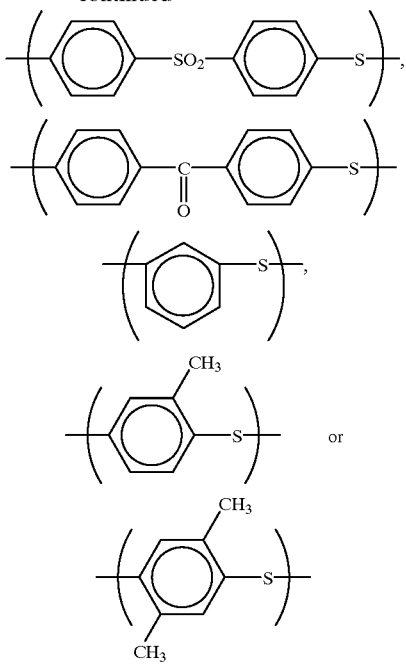

Processes for the manufacture of the PPSs which can be applied according to the invention are well known. All of them can be employed. A process comprises heating an alkali metal sulphide, in most cases sodium sulphide hydrate, in a polar solvent to remove the water of hydration therefrom, followed by the addition of a di-halogenated aromatic compound, in particular p-dichloro-benzene, and polymerisation at a higher temperature (see, for example, patent U.S. Pat. No. 3,354,129 (Phillips Petroleum)). The molecular weight of the PPS obtained can be increased in a known manner by oxidative posttreatment resulting in branched products or by addition of known agents for increasing the molecular weight (esters, anhydrides, alkali metal carboxylates and sulphonates, etc.) to the polycondensation mixture, resulting in linear products of high molecular weight.

The molecular weight of the PPS which can be employed according to the invention can vary within wide measures. It is generally such that the melt index of the PPS is between 5 g/10 min and 10,000 g/10 min, preferably between 10 g/10 min and 500 g/10 min, determined according to ASTM standard D 1238-74 T, at a temperature of 315° C. under a 5-kg load).

The PPS which can be employed according to the invention may contain conventional additives in quantities which cannot be detrimental to the properties of the compositions according to the invention. By way of such additives there may be mentioned in particular: antioxidants and heat stabilisers such as, for example, hindered phenols, thioesters and phosphites, anti-UV agents such as, for example, resorcinol, benzotriazole and benzophenone, flame-retardant agents such as, for example, antimony salts, aryl chlorophosphates and chlorinated paraffins, lubricants such as, for example, graphite, molybdenum disulphide and silicones, corrosion inhibitors such as, for example, alkali metal carbonates, pigments such as, for example, titanium dioxide and zinc sulphide, processing agents such as, for example, aromatic esters of phosphoric acid and microtalc, agents for controlling the degree of crosslinking such as, for example, peroxides, crosslinking accelerators such as, for example, metal salts of thiophosphinic acid, cross-linking inhibitors such as, for example, dialkyltin dicarboxylates, impact strength improvers such as, for example, elastomeric copolymers derived from olefins and glycidyl esters of alpha,beta-unsaturated carboxylic acids, and the like.

The compositions according to the invention also contain a polyamide (called PA hereinafter). This poly-amide is generally chosen from PAs derived from, on the one hand, aliphatic, alicyclic and aromatic amines and, on the other hand, aliphatic, alicyclic and aromatic dicarboxylic acids.

Examples of amines which can be employed are hexamethylenediamine, decamethylenediamine, dodecamethylenediamine, 2,2,4- and 2,4,4-trimethyl-hexamethylenediamines, 1,3- and 1,4-bis(aminomethyl)-cyclohexanes, bis(p-aminocyclohexylmethane), m-xylylenediamine and p-xylylenediamine.

Examples of acids which can be employed are adipic, suberic, sebacic, glutaric, azelaic, cyclohexane-dicarboxylic, isophthalic and terephthalic acids.

They may also be PAs derived from the halides or dialkyl esters of these acids, aminocarboxylic acids such as, for example, 6-aminocaproic, 6-aminocaprylic, 6-aminolauric, 11-aminoundecanoic and 12-aminododecanoic acids, or else lactams derived from these acids, such as, for example, $\epsilon$-caprolactam and $\omega$-dodecalactam.

These PAs may be derived from more than one amine or more than one acid; mixtures of different PAs can also be employed.

Examples of PAs which can be employed are polyhexamethylene adipamide (nylon 66), polyhexamethylene sebacamide (nylon 610), polycapramide (nylon 6) and polydodecanamide (nylon 12), as well as the PAs obtained by reaction of condensation of m-xylylenediamine with adipic acid (PAMXD6).

Preferred PAs are nylon 66 and PAMXD6.

The compositions according to the invention generally contain from 10 to 300 parts by weight of PA per 100 parts by weight of PPS, preferably from 25 to 250 parts by weight of PA per 100 parts by weight of PPS.

When it is desirable that the PPS should form the continuous phase of the mixture of PPS and PA, for example with the aim of maintaining the heat resistance of the compositions according to the invention at higher values, the latter generally contain from 25 to 95 parts by weight of PA per 100 parts by weight of PPS, preferably from 35 to 80 parts by weight of PA per 100 parts by weight of PPS.

The compositions according to the invention also contain a metal hydroxide in which the main constituent is magnesium hydroxide. "Metal hydroxide" is hereinafter intended to denote those in which the main constituent is magnesium hydroxide (called more simply magnesium hydroxide hereinafter, reference being made only to its main constituent), that is to say compounds containing more than 50% by weight of $Mg(OH)_2$, preferably more than 90% by weight of $Mg(OH)_2$, other hydroxides which may be present being, for example, calcium hydroxide, aluminium hydroxide and barium hydroxide, or mixtures thereof. It is possible to employ a natural magnesium hydroxide such as brucite or nemalite, or a synthetic magnesium hydroxide obtained, for example, by electrolysis of a magnesium salt or by precipitation of a magnesium salt using potassium hydroxide or sodium hydroxide. This metal hydroxide may be in the form of powder, granules or fibres. Good results are obtained when the metal hydroxide consists essentially of magnesium hydroxide.

The compositions according to the invention generally contain from 20 to 350 parts by weight of metal hydroxide per 100 parts by weight of PPS, preferably from 50 to 200 parts by weight per 100 parts by weight of PPS. The best results are obtained when the said compositions contain from 75 to 150 parts by weight of metal hydroxide per 100 parts by weight of PPS.

According to a preferred embodiment of the present invention the compositions based on PPS, PA and metal hydroxide additionally contain from 20 to 500 parts of a fibrous reinforcing material per 100 parts by weight of polyphenylene sulphide. The incorporation of this material has the effect of maintaining the thermo-mechanical and chemical performance of the PPS at high values. By way of examples of fibrous reinforcing materials which can be employed according to the invention there may be mentioned glass fibres, asbestos fibres, metal carbide or boride fibres, alumina, zirconia and silica fibres, gypsum fibres, aramid fibres and the like.

These fibres generally have a diameter which does not exceed approximately 30 $\mu$m, preferably from 0.5 to 20 $\mu$m, and a length which does not exceed approximately 15 mm, preferably from 1 to 10 mm.

The fibrous reinforcing material may also belong to the class of whiskers, which are thread-shaped mono-crystals of limited diameter; by way of examples of whiskers which can be employed according to the invention there may be mentioned potassium titanate, silicon carbide, silicon nitride, boron and similar whiskers. These whiskers generally have a diameter of 0.1 to 3 $\mu$m, preferably from 0.1 to 2 $\mu$m, and a length which does not exceed 100 $\mu$m, preferably from 10 to 20 $\mu$m.

The preferred fibrous reinforcing materials are glass fibres and aramid fibres.

A fibrous reinforcing material which is very particularly preferred consists of glass fibres, optionally treated with conventional coupling agents. Silanes may be mentioned as such agents. Examples of glass fibres which can be employed are the glass fibres marketed under the names Vetrotex P388, P327, 5145, Silenka 8087 and 8045 and OCF CS R23DX1 and R17BX1.

The compositions according to the invention preferably contain from 25 to 250 parts by weight of fibrous reinforcing material per 100 parts by weight of PPS. The best results are obtained when the said compositions contain from 90 to 220 parts by weight of fibrous reinforcing material per 100 parts by weight of PPS.

Besides the PPS, the PA, the metal hydroxide and, where appropriate, the fibrous reinforcing material, which are the essential constituents of the compositions according to the invention, the latter may also optionally contain, in quantities which are not capable of being detrimental to their properties:

other fillers such as wollastonite, talc, mica, clay, kaolin, bentonite, calcium and magnesium carbonates and sulphates, magnesium phosphate, ballotini, titanium dioxide, alumina and the like;

other thermoplastic polymers such as polyether-ketones, polyimides, polyesters, polysulphones, polyethersulphones, polyetherimides, polyphenylene ethers, fluoropolymers, polyolefins, polystyrene, poly-alkyl acrylates, and the like;

elastomers such as fluoroelastomers, silicones, olefin rubbers, acrylic rubbers, butyl rubber and the like.

It is further possible to incorporate other light, heat and oxidation stabilisers, flame retardants, dyes, pigments, lubricants and demoulding agents facilitating the processing.

It is also possible to incorporate a conventional nucleating agent for the PA constituent of the compositions according to the invention, such as talc and alkali and alkaline-earth metal phosphates.

The compositions according to the invention can be prepared by any of the known techniques ensuring a thorough and homogeneous mixture of their constituents. Thus, the PPS, the PA, the metal hydroxide and, if appropriate, the fibrous reinforcing material and the optional other ingredients and additives may be mixed dry and then melt-blended. Any mixer whatever may be used for producing the dry mix, such as the ribbon blenders, tumble blenders and fast mixers marketed by the companies Henschel, Loedige, Dyosna and others.

Mixers of the external type or mixers of the internal type, such as those marketed by the companies Troester, Banbury and others can be employed equally well for carrying out the melt blending. For technical and economic reasons, however, it is preferred to work in mixers of the internal type and, more particularly, in extruders, which form an individual class of internal mixers.

The compositions according to the invention are capable of being processed by any conventional processes for the conversion of plastics and more particularly by injection moulding. These compositions are suitable for the manufacture of all kinds of shaped objects and more particularly of injection-moulded objects which exhibit an excellent compromise of heat resistance, tracking current resistance and arc resistance, such as circuit breakers, multipole rods, breaker bulbs, electrical component cabinets and the like.

The following examples are used to illustrate the invention. Examples 1 to 3 and 7 are carried out according to the invention. Examples 4R, 5R and 6R are given by way of comparison.

EXAMPLES

Compositions are produced by dry mixing and then blending, at 280° C., in a twin-screw Werner & Pfleiderer ZSK-40 extruder, the base constituents cited in the table below in quantities which are also shown in this table.

The extruded reeds are granulated conventionally and the granules obtained are injection moulded into 125 mm×125 mm×4 mm sheets on a Netstall 150T press.

These sheets are employed for determining the tracking current resistance value (CTI) of the compositions on the basis of the stipulations of CEI standard 112.

The results are collated in the table below.

These sheets are also employed to determine the arc resistance ($R_{arc}$) of the compositions on the basis of the stipulations of ASTM standard D495.

The results are collated in the table below.

Finally, the heat resistance of the compositions is assessed by evaluating the loss in their tensile strength (measured according to ASTM standard D638) on test pieces aged for 2,000 hours at 180° C.

The results are also collated in the table below.

| Example | 1 | 2 | 3 | 4R | 5R | 6R | 7 |
|---|---|---|---|---|---|---|---|
| PPS (a) (% by weight) (1) | 20 | 20 | 10 | 35 | 35 | 20 | 24 |

-continued

| Example | 1 | 2 | 3 | 4R | 5R | 6R | 7 |
|---|---|---|---|---|---|---|---|
| PA MXD6 (b) | 15 | — | 25 | — | — | 15 | — |
| PA 66 (c) (% by weight) (1) | — | 15 | — | — | — | — | 16 |
| GF (d) (% by weight) (1) (2) | 40 | 40 | 40 | 40 | 40 | 40 | 40 |
| Mg(OH)$_2$ (% by weight) (1) (2) | 25 | 25 | 25 | 25 | — | — | 20 |
| CaCO$_3$ (% by weight) (1) (2) | — | — | — | — | 25 | 25 | — |
| CTI (V) | 600 | 600 | 600 | 275 | 200 | 300 | 600 |
| $R_{arc}$ (s) | 132 | 136 | 110 | 183 | 5 | 10 | 98 |
| Loss in tensile strength after aging for 2,000 hours at 180° C. | less than 10% | less than 10% | less than 20% (3) | 0% | 0% | less than 10% | less than 10% |

Table (continuation)
(1) relative to the total weight of the composition
(2) same percentage by weight relative to the total weight of the thermoplastic constituents (PA and/or PPS) in all the examples
(3) at 160° C.
(a) marketed by Tohpren under the name T1
(b) number-average molecular weight: approximately 15,500
(c) BASF product Ultramid A-4H
(d) Vetrotex product EC 10 4.5 mm P327

These results show that the compositions according to the invention exhibit the best compromise of the three properties sought after.

What is claimed is:

1. A composition exhibiting heat resistance, tracking current resistance, and arc resistance containing polyphenylene sulphide, and per 100 parts by weight of polyphenylene sulphide:

about 10 to 300 parts by weight of a polyamide prepared by polycondensation of adipic acid and m-xylylenediamine; and about 20 to 350 parts by weight of a metal hydroxide in which the main constituent is magnesium hydroxide.

2. The composition according to claim 1, wherein the metal hydroxide consists essentially of magnesium hydroxide.

3. The composition according to claim 1, containing from about 25 to 95 parts by weight of polyamide per 100 parts by weight of polyphenylene sulphide.

4. The composition according to claim 1, containing from about 50 to 200 parts by weight of metal hydroxide per 100 parts by weight of polyphenylene sulphide.

5. The composition according to claim 1, additionally containing from about 20 to 500 parts of a fibrous reinforcing material per 100 parts by weight of polyphenylene sulphide.

6. The composition according to claim 5, wherein the fibrous reinforcing material consists of glass fibres.

7. The composition according to claim 5, containing from about 25 to 250 parts by weight of fibrous reinforcing material per 100 parts by weight of polyphenylene sulphide.

8. An object formed by moulding compositions according to claim 1.

* * * * *